March 13, 1962 E. H. GATZERT 3,025,353
TRANSFER MEANS FOR REVERTING CALL CIRCUIT
Filed July 25, 1957
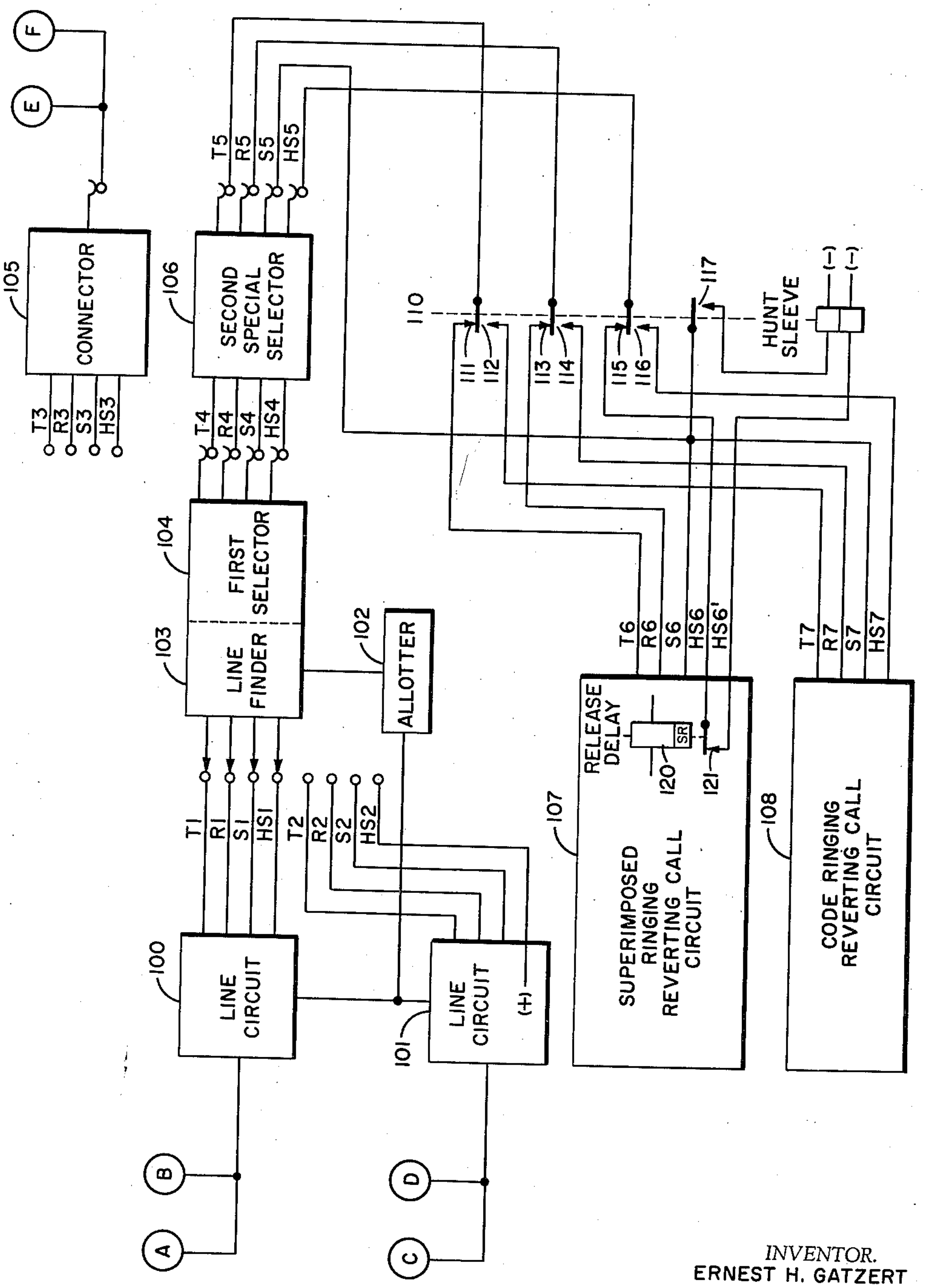
INVENTOR.
ERNEST H. GATZERT
BY George J. Seligsohn
ATTORNEY United States Patent Office 3,025,353

Patented Mar. 13, 1962

3,025,353
TRANSFER MEANS FOR REVERTING CALL CIRCUIT

Ernest H. Gatzert, Rochester, N.Y., assignor to General Dynamics Corporation, Rochester, N.Y., a corporation of Delaware Filed July 25, 1957, Ser. No. 674,066
2 Claims. (Cl. 179—17)

This invention relates to a telephone system and, more particularly, to means in a telephone system for transferring a call from a first reverting call circuit to a second reverting call circuit in response to a given marking potential being present on a control conductor.

Reverting call circuits are well known in the telephone art, and are utilized in setting up a connection between one party on a party line and another party on the same party line. One of several things controlled by a reverting call circuit is ringing. Since there are several types of ringing, any one of which may be utilized on party lines, such as, superimposed ringing, harmonic ringing and code ringing, all of which are well known in the art, the particular circuitry employed by a reverting call circuit for ringing is dependent upon the particular type of ringing being utilized.

Since some of the party lines in a telephone exchange may utilize one type of ringing, while other lines in the same exchange may utilize another type of ringing, it is necessary to select the proper reverting call circuit in accordance with that type of ringing being utilized by the particular line initiating a call.

It is an object of this invention to provide means for selecting that one of two reverting call circuits providing different types of ringing in accordance with the line initiating a call.

It is a further object of this invention to provide means for extending a connection to a first reverting call circuit providing a first type of ringing and for transferring the connection from the first reverting call circuit to a second reverting call circuit providing a second type of ringing only in case the line initiating the call requires the second type of ringing.

These and other objects and advantages will become apparent from the following detailed description taken together with the accompanying drawing, in which:

The sole FIGURE is a block and schematic diagram of a telephone system incorporating a preferred embodiment of the present invention.

Referring now to the drawing, line circuit 100 is individual to a party line having parties A and B thereon, while line circuit 101 is individual to another party line having parties C and D thereon.

The party line connected to line circuit 100 is one of a majority of the lines of a telephone exchange in which the subsets of the parties thereon utilize superimposed ringing, while the party line connected to line circuit 101 is one of a minority of lines of the telephone exchange in which the subsets of the parties thereon utilize code ringing. Thus, parties A and B have subsets utilizing superimposed ringing while parties C and D have subsets utilizing code ringing. In order to differentiate between line circuits of party lines having superimposed ringing and those of party lines having code ringing, the HS control conductor of line circuits, such as line circuit 101, of party lines having code ringing are connected to ground, as shown, while the HS control conductor of line circuits, such as line circuit 100, of party lines having superimposed ringing are not connected to ground.

In a manner well known in the art, when either party A or B initiates a call by removing his phone from the hookswitch, an allotter start signal is applied to allotter

102 from line circuit 100, causing allotter 102 to apply pulses to one of a group of line finders, such as line finder 103, which was preselected by allotter 102, to cause line finder 103 to hunt for and find line circuit 100 to thereby extend a connection from respective conductors T1, R1, S1 and HS1 of line circuit 100 to first selector 104, which is integral with line finder 103. In a similar manner, the initiation of a call by either party C or D causes line finder 103 to hunt for and find line circuit 101 and extend a connection from respective conductors T2, R2, S2 and HS2 to first selector 104.

Consider a general case in which either party A or B is calling a party on some other private or party line, such as party E or F. The calling party, A or B as the case may be, will dial the directory number of E or F, as the case may be, thereby causing the wipers of first selector 104 to be stepped into contact with terminals T3, R3, S3 and HS3 of connector 105, and then operating the switch of connector 105 to complete a connection to party E or F. In a similar manner, a call initiated by party C or D will be extended to party E or F over respective conductors T2, R2, S2 and HS2, first selector 104, respective terminals T3, R3, S3 and HS3, and connector 105.

However, in the special case where party A is calling party B, or party C is calling party D, i.e., where both the calling party and the called party are on the same party line, it is necessary to provide a connection through a second special selector and a reverting call circuit, rather than through a connector, such as connector 105.

Consider first the situation in which party C is calling party D. In this case, party C first dials a first predetermined digit which causes first selector 104 to step its wipers to terminals T4, R4, S4 and HS4, respectively, thereby extending a connection between conductor T2 and terminal T4, conductor R2 and terminal R4, conductor S2 and terminal S4, and conductor HS2 and terminal HS4, respectively. This results in the seizure of second special selector 106 which has its input connected to terminals T4, R4, S4 and HS4. Special second selector 106 has at least one of its levels reserved for reverting call service, other levels being used for other special services, such as access to information, etc.

The calling party C now dials a second predetermined digit which steps the wipers of second special selector 106 to terminals T5, R5, S5 and HS5, respectively, reserved for reverting call service. Thereby, a connection is extended from conductor T2 to terminal T5, from conductor R2 to terminal R5, from conductor S2 to terminal S5, and from conductor HS2 to terminal HS5, respectively, through line finder 103, first selector 104 and second special selector 106.

Terminal T5 is connected to conductor T6 of superimposed ringing reverting call circuit 107 through normally closed contacts 111; terminal R5 is connected to conductor R6 of superimposed ringing reverting circuit 107 through normally closed contacts 113; terminal S5 is connected to conductor S6 of superimposed ringing reverting call circuit 107 and conductor S7 of code ringing reverting call circuit 108 as well as through normally open contacts 117 and the upper winding of hunt sleeve relay 110 to grounded battery; and terminal HS5 is connected to conductor HS6 of superimposed ringing reverting call circuit 107 through normally closed contacts 115. As shown, conductor HS6 is further extended through normally closed contacts 121 of release delay relay 120 of superimposed ringing reverting call circuit 107 to conductor HS6′ and then through the lower winding of hunt sleeve relay 110 to grounded battery.

As previously described, conductor HS2 of line circuit 101 has ground applied thereto. This ground on conductor HS2 is forwarded over the extended HS connection, just described, to conductor HS6' and the lower winding of hunt sleeve relay 110 to grounded battery to effect the energization and operation thereof. The operation of hunt sleeve relay 110 effects the opening of normally closed contacts 111, 113 and 115 thereof and the closing of normally open contacts 112, 114, 116 and 117 thereof.

The opening of contacts 111, 113 and 115 and the closure of contacts 112, 114 and 116 transfers terminals T5, R5 and HS5, respectively, from conductors T6, R6 and HS6, respectively, of superimposed ringing reverting circuit 107 to conductors T7, R7 and HS7, respectively, of code ringing reverting call circuit 108, to thereby seize code ringing reverting call circuit 108. The speed of operation of hunt sleeve relay 110 is fast enough to prevent the seizure of superimposed ringing reverting call circuit 107 prior to the operation thereof.

As is well known in the art, in the process of extending a connection over a switch train, ground is forwarded over the sleeve from a preceding piece of equipment during the short interval it takes to seize the next piece of equipment, and after seizure of the next piece of equipment ground is returned over the sleeve to the preceding piece of equipment. In the case under discussion, second special selector 106 is the preceding piece of equipment, the reverting call circuit 107 or 108 is the next piece of equipment, and the connection from terminal S5 to conductors S6 and S7 is the sleeve. Therefore, in the situation under discussion, ground will be present on conductors S6 and S7, so that this ground will be applied to the upper winding of hunt sleeve relay 110 through operated contacts 117 thereof to hold hunt sleeve relay 110 operated.

Therefore, when party C calls party D, both of them being on a party line which utilizes code ringing, the ground on the HS2 conductor of line circuit 101 of this party line will result in the proper reverting call circuit, i.e., code ringing reverting call circuit 108, being employed in completing this connection.

Assume now that party A, on a party line utilizing superimposed ringing, calls party B on the same line. In this case, a connection will be extended from conductors T1, R1, S1 and HS1, respectively, of line circuit 100 to conductors T6, R6, S6 and HS6, respectively, of superimposed ringing reverting call circuit 107, in the same manner as previously described in connection with the extension of a connection from conductors T2, R2, S2 and HS2, respectively, of line circuit 101 to conductors T6, R6, S6 and HS6, respectively, of superimposed ringing reverting circuit 107. Furthermore, conductor HS6 is further extended through normally closed contacts 121 and conductor HS6' to the lower winding of hunt sleeve relay 110 and grounded battery, as before. However, since conductor HS1 of line circuit 100 is not connected to ground, as previously described, no operating potential is applied over the extended HS connection to hunt sleeve relay 110. Therefore, hunt sleeve relay 110 does not operate in this case. This permits the seizure of superimposed ringing reverting circuit 107. In response to the seizure thereof, release delay relay 120 of superimposed ringing reverting circuit 107 is operated in a manner well known in the art, thereby opening normally closed contacts 121 thereof which breaks the previously described operating path, through conductor HS6', of hunt sleeve relay 110.

Thus, in the case of party lines utilizing superimposed ringing, such as the party line of line circuit 100, the proper reverting call circuit to provide superimposed ringing is employed.

Although only a preferred embodiment of the present invention has been described herein, it is not intended that the invention be restricted thereto, but that it be limited only by the scope of the appended claims.

What is claimed is:

1. In a telphone system, the combination comprising a plurality of telephone lines, first and second independent circuits, relay means having a plurality of normally closed contacts and a plurality of normally open contacts, first means including a control conductor for selectively controlling the extension of a connection from any one of said lines and said control conductor to said first circuit through said normally closed contacts when said relay means is unoperated and for selectively extending a connection from any one of said lines and said control conductor to said second circuit through said normally open contacts when said relay means is operated, second means coupled to said first circuit for further extending the connection thereto of said control conductor to said relay means to effect the operation of said relay means in response to a given potential marking being present on said control conductor, third means coupled to said relay means for holding said relay means operated in response to said relay means having been initially operated, said third means including conductor means and additional normally open contacts on said relay means for connecting said relay means to each of said first and second circuits and said first means through said additional contacts, and means within said first and second circuits and first means for applying a holding potential to said conductor means.

2. In a telephone system, the combination comprising a plurality of telephone lines, first and second independent circuits, relay means having a plurality of normally closed contacts and a plurality of normally open contacts, first means including a control conductor for selectively controlling the extension of a connection from any one of said lines and said control conductor to said first circuit through said normally closed contacts when said relay means is unoperated and for selectively extending a connection from any one of said lines and said control conductor to said second circuit through said normally open contacts when said relay means is operated, second means coupled to said first circuit for further extending the connection thereto of said control conductor to said relay means to effect the operation of said relay means in response to a given potential marking being present on said control conductor, normally closed contacts in said first circuit, and means included in said second means for further extending the connection of said control conductor to said relay means through said normally closed contacts of said first circuit.

References Cited in the file of this patent

UNITED STATES PATENTS

| | | |
|---|---|---|
| 1,256,126 | Goodrum | Feb. 2, 1918 |
| 1,487,996 | Williams | Mar. 25, 1924 |
| 2,340,555 | Peterson | Feb. 1, 1944 |
| 2,411,525 | Deakin | Mar. 26, 1946 |
| 2,544,944 | Wicks | Mar. 3, 1951 |
| 2,765,368 | Horwitz et al. | Oct. 2, 1956 |
| 2,809,235 | Trousdale | Oct. 8, 1957 |
| 2,874,223 | Hutton | Feb. 17, 1959 |